> United States Patent Office 3,764,285
Patented Oct. 9, 1973

3,764,285
MANUFACTURE OF FLOAT GLASS HAVING
CONTROLLED WIDTH
Joseph M. Matesa, Pittsburgh, and Aloysius W. Farabaugh, Verona, Pa., assignors to PPG Industries, Inc., Pittsburgh, Pa.
Continuation of application Ser. No. 261,497, June 9, 1972. This application June 9, 1972, Ser. No. 261,493
Int. Cl. C03b 18/02
U.S. Cl. 65—99 A
9 Claims

ABSTRACT OF THE DISCLOSURE

In the manufacture of float glass, the width of the glass formed is controlled by detecting the width of the ribbon after it is substantially cooled and attenuated, and employing the error of the detected width from the target width to control the target width of the ribbon at a point upstream in the process where the ribbon is hot and acting as a viscous liquid, by detecting the width of the ribbon at the upstream point and employing the error of that detected width from its target width to control the target position of a tweel or gate controlling the flow of molten glass ino the float bath and controlling the tweel to ultimately control final ribbon width in a stable manner.

CROSS-REFERENCE TO RELATED APPLICATION

This application is related to copending, commonly assigned application, Ser. No. 261,497, filed on even date herewith by Aloysius W. Farabaugh and Joseph A. Gulotta, and entitled, "Edge Detector." This related application is incorporated herein by reference.

BACKGROUND OF THE INVENTION

This invention relates to the manufacture of flat glass of good optical quality, uniform thickness and uniform width of the float process.

In the practice of the float process, molten glass is discharged onto a molten bath of metal, such as tin, and a ribbon of glass is caused to form by the attenuation of the discharged body of molten glass due to forces applied to the glass for pulling it along the bath of molten metal while gradually cooling the glass until it becomes dimensionally stable. Following formation of a dimensionally stable ribbon of glass, the glass is removed from the bath and passed through an annealing lehr in order to anneal the glass. Thereafter, the glass is cut into selected size pieces for further processing and sale. See U.S. Pat. No. 3,083,551.

Flat glass made by the float process may be produced having a thickness controlled by the adustment of particular conditions within the float bath chamber. While a molten body of glass floating on a bath of tin will naturally assume an equilibrium thickness of about 6.87 millimeters (0.271 inch), thicknesses both greater and less than equilibrium thickness are obtainable. In general, to obtain a final glass thickness which is greater than equilibrium thickness, it has been the practice to place restrictor elements on either side of the ribbon of glass at a point and at a location within the bath chamber where the glass is sufficiently hot to behave as a viscous liquid. In order to make glass having a thickness which is less than equilibrium thickness, there have been practiced two alternative techniques: one technique is to discharge the molten glass onto a tin bath at a discharge rate which produces a relatively wide body of molten glass and to apply attenuating forces to the glass along its direction of travel by substantial acceleration of the ribbon due to high speed operation of the driving rolls and lehr rolls downstream in the process; a second method is used to discharge glass at a sufficiently high discharge rate to provide for a body of molten glass which is substantially wider than the intended final ribbon width, but not so wide as in the first technique, and to apply lateral attenuation forces to the ribbon by edge rolls or the like, in addition to supplying attenuation forces in the direction of ribbon travel.

In the making of equilibrium thickness glass and thinner than equilibrium thickness glass by the float process, substantial attenuation of the ribbon causes a decrease in ribbon width corresponding to travel downstream through the bath chamber. Though the effect is less pronounced in making thicker glass, some attenuation occurs in its manufacture also. A variety of forces and properties affect the ultimate thickness and width of a ribbon of flat glass. Among the forces affecting glass width and thickness are the axial or longitudinal attenuating forces which are imposed by the pulling of the cooled, rigid glass passing out of the float bath and through the annealing lehr, the lateral or sideward pulling or pushing of edge attenuators or restrictors, respectively, the pushing force of additional molten glass being discharged from the melting and refining furnace into the float bath and the downward forces of gravity and atmospheric pressure acting upon the floating ribbon of glass. Properties which affect the ultimate width and thickness of a float-formed glass ribbon include the density of the glass, the surface tension of the glass-metal interface, the viscosity of the glass and the variation of these properties and the flow conditions of the underlying metal due to thermal effects and variations existing throughout the float bath chamber.

In addition to being attenuated and cooled as it travels through the float bath chamber, a ribbon of glass may also be caused to move laterally with respect to its principal direction of travel due to molten metal flows, thermal effects and the like. It is thought that this movement, along with non-uniform attenuation and cooling, are included among causes of optical distortion due to minute thickness variations of the ultimate glass ribbon.

Workers skilled in the art of float glass manufacture have considered it a desirable objective to determine the position of a ribbon of glass and the width of a ribbon of glass within a float bath chamber during manufacture. The hostile environment in a float bath chamber has severely limited advancements in detecting ribbon location and ribbon width within a float bath and has deterred control of ultimate ribbon width, thickness and optical quality responsive to measured conditions within the float bath while the glass is being formed. Exemplary of past attempts to detect the edge of a ribbon of glass during forming are U.S. Pat. Nos. 3,482,954 and 3,500,548. These prior art devices and methods, as well as the device and method of recent French Pat. No. 2,060,235, fail to provide a method for contolling ultimate ribbon width with a stable control loop.

A substantial period of time elapses between the discharge of glass into a float bath and the removal of an attenuated, cooled ribbon from the bath. If a direct feedback control loop is employed to control the final width of the glass ribbon by adjustment or manipulation of the glass input flow, an unstable condition is likely to result. On the other hand, if control is confined to the hot end of the bath, heat variations, variations in forces and the like through the length of the bath can prevent control of the final ribbon width.

SUMMARY OF THE INVENTION

Flat glass is manufactured in a float process which is so controlled as to produce a glass ribbon of uniform width and thickness. Molten glass is discharged through a canal of variable effective flow cross section onto a pool of molten metal. On the pool of molten metal, the glass forms a thin floating ribbon to which are applied attenuating forces. The forces applied to the floating ribbon of hot glass pull the glass along the surface of the molten metal and the glass is cooled as it moves along its path. When cooled and attenuated, the ribbon of glass is lifted from the molten metal surface and conveyed to an annealing lehr by supporting rolls which are driven in the direction of glass movement and which apply the principal pulling and attenuating forces to the glass.

In the present method, the width of the ribbon of glass is detected at a location which is substantially downstream in the process where the ribbon has been sufficiently cooled to prevent any further substantial attenuation. The width of the ribbon of glass is also detected at a location which is sufficiently close to the canal where the glass is yet hot enough to flow as a viscous liquid. Preferably, the method also entails detecting the position of a sluice gate or tweel, which is positioned across the canal and controls the cross-sectional flow area for molten glass through the canal.

In carrying out the present method, the ribbon width which is detected at the downstream location is compared with a predetermined standard. The difference between the detected downstream ribbon width and the predetermined standard is defined as an error, and the comparison generates an error signal.

The error signal from the downstream ribbon width is employed to provide a dynamic standard which is responsive to that error signal. The detected ribbon width at the hot upstream location within the process is compared with this standard, and the difference is a second error. A second error signal is generated responsive to this comparison.

A control signal for the tweel position is generated in response to the second error signal. In the preferred method, with the tweel position detected, the detected tweel position is compared with this control signal, serving as a dynamic standard, and an error signal is generated. Then a control signal is generated responsive to the error signal of this comparison. The control signal is employed to control a drive mechanism which moves the tweel responsive to the control signal. Alternatively, the control signal responsive to the second error signal may be directed employed to control the drive mechanism.

By employing the described control scheme, it is possible to control the ultimate width of a ribbon of glass produced by the float process in a stable fashion. By employing a downstream ribbon width to generate a dynamic control standard for an upstream ribbon width determination and employing such an upstream ribbon width determination to provide a dynamic standard for the control of a tweel position, it is possible to control the ribbon width while compensating for various uncontrolled variables within the process, such as molten metal flows, heating and cooling of glass within the bath chamber, slight variations in incoming glass viscosity, other melting tank variations, slight variations in edge roll or drive roll speed and the like. Unlike the fixed mode ribbon width control schemes of the past, which cannot adequately account for these uncontrolled influences within the float-forming chamber and which are subject to instability if employing a single fixed setpoint control loop, the present method provides for control of the process without risking instability.

The frequency of ribbon width changes due to the influence of uncontrolled variables, as mentioned above, is not dependent upon, nor easily correlated with, the overall rate of glass manufacture. Such width variations are preferably accommodated by the present control method by providing for width detection sampling times and related control times which avoid bias by the proper coordination of such times with process transport lag between sensors or detectors. Preferably, the effective sample and control periods for control loops having sensors farther downstream will be greater than the effective periods for loops having sensors farther upstream. Also, it is preferred that sample periods be other than, and preferably less than, the observed periods of width variation due to uncontrolled variables. For any given float manufactruing process operating at a particular rate of manufacture a characteristic period of width variation due to uncontrolled variables may be observed, and stable control may be imposed on such a process by accommodating this effect in the manner described. In this manner stability of the process is enhanced.

While continuous detection of the pertinent variables of the present control scheme is possible employing the preferred apparatus, which will be described in detail below, it is not a necessity that the variables be measured continuously with respect to time. It has been found that a stable control is accomplished by providing the individual control loops, which are nested together in the present control scheme, with sampling frequencies having increasing cycle times corresponding to the increasing distance downstream through the process at which each loop sensor or detector is located. It has been found that appropriate cycle times for sampling detected conditions at the detector location of each next outer loop in the scheme appropriately increase by about a factor of 1.5 to 6, and preferably about a factor of 2 per minute of lag between sensors. Typical sample periods which are preferred are from about 1 to 10 seconds for the tweel height control loop, of from about 3 to about 60 seconds for the upstream width loop and of from about 16 to 720 seconds for the downstream width loop.

While any known control mode may suitably be employed for the individual loop controls, it is preferred that each loop employ proportional and integral control modes with a dead band provided. In the preferred embodiments, the dead band for the tweel height should be from about 1 to 10 thousandths of an inch, and preferably about 3 to 4 thousandths of an inch. The preferred dead band for the upstream width should be from about .1 to 1 inch, and preferably about .2 to .4 inch. The dead band for the downstream width should be from about .01 to about .5 inch, and preferably about .1 inch.

In practicing the present method, the output of each controller which is directed to the next upstream controller of the next nested control loop should be provided and held until the next sampling time. Tolerable signal limits should be provided to each controller, in addition to a predetermined standard, which define a tolerable likely change which is not due to some instrument error. Changes which are indicated to be outside the tolerable range, and therefore probably due to instrument error, should be shunted from the comparison made by the controller so that the previously provided output is maintained at its formerly fixed lexel. In this manner, control is stable even in the event of instrument error or equipment failure.

The innermost nested upstream control loop for operating the tweel or sluice gate is designed to hold fixed the sluice gate position in the absence of positively imposed signals directing its movement in either direction. This feature is also intended to provide a control scheme which, in the event of some equipment failure, will maintain the operation at a stable condition.

The present invention will preferably employ edge detectors as disclosed in the copending application entitled "Edge Detector," filed on even date herewith, which is incorporated by reference herein. When employing such detectors, the control scheme will further include a method for calibrating these devices and for converting the signals from these devices into meaningful representations of the width and position of the hot glass being formed.

The controllers required to carry out the present control method may comprise conventional analog or digital controllers. Typical pneumatic or electric analog controllers may be employed or, preferably, a digital computer may be employed to provide all controller functions. When employing a digital computer, analog-to-digital signal conversion will necessarily be provided.

BRIEF DESCRIPTION OF THE DRAWINGS

The present invention will be further understood with reference to the accompanying drawings, in which like reference numbers indicate like elements.

The details of the preferred embodiments of this invention may be readily understood from the description which follows, making referenec to the attached drawings.

DESCRIPTION OF THE PREFERRED EMBODIMENTS

Figure 1:
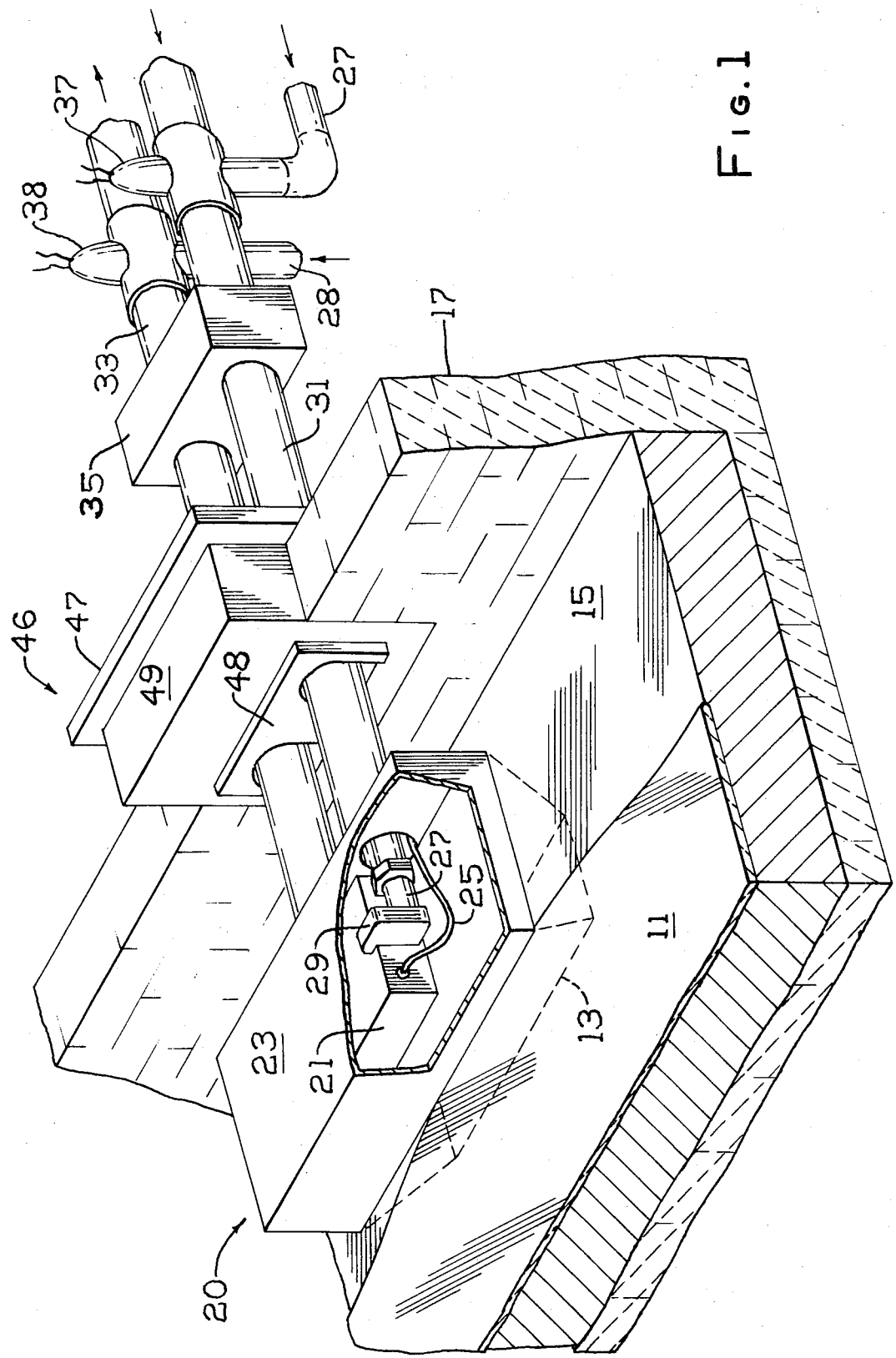
FIG. 1 is a schematic perspective view of an edge detector apparatus, which is preferably employed in the practice of the present invention, showing the spatial relationship between the detector and a hot body of glass on molten metal in a float bath chamber.

Referring to FIG. 1, a section of the interior of a float bath chamber is shown. The bath comprises refractory walls 17 and a pool or bath of molten metal, preferably tin, 15 in the bottom of the chamber. Floating on the molten tin 15 is a body of hot glass 11, which is undergoing attenuation and cooling into a final ribbon or flat glass.

An edge detection device 20 is positioned above the hot glass and molten tin in facing relation thereto viewing area 13. Area 13 is a target area which is shielded from radiation reflected from the surroundings. The device detects the position of a ribbon edge which is seen in a viewing area substantially within the shielded target area.

The edge detecting device comprises an enclosure 21 surrounded by a radiation-shielding enclosure 23. A space provided between enclosure 21 and the surrounding jacket or shield enclosure 23 is continuously supplied during operation with a high heat capacity coolant, such as water. The device is supported by coolant pipes 31 and 33, which are connected to the jacket 23 on opposite sides of the enclosure 21. These pipes support the detector 20 over the edge of the hot glass.

The device is mounted through the wall of a float bath chamber through side seal 46, which comprises a refractory block 49 having a rectangular hole through which the jacket-containing enclosure will pass. A slotted plug 48 is provided to seal the rectangular hole when the device is inserted into the bath and is sized to wedge downwardly against pipes 31 and 33, rigidly holding the entire apparatus in position once installed. The side seal is further provided with a backplate 47.

The supporting coolant pipes 31 and 33 are provided with a cross member 35 to prevent twisting of the combination.

An elongated heat flux detector is provided within enclosure 21. This heat flux detector is a device which measures the temperature difference across a thermal insulator with the cold side of the insulator directly cooled by the coolant provided to the jacket. The hot side of the detector is positioned to face the hot glass and molten metal through an elongated window and the bottom of the enclosure and jacket facing the glass and metal.

The space surrounding the heat flux detector is continuously purged with gas, such as nitrogen. Purge gas lines 27 and 28 are directed axially through the coolant lines and enter the jacket or surrounding shield 23. There, for example, purge gas line 27 is connected to the enclosure 21 by purge line connecting duct 29.

Preferably, the purge gas connecting duct 29 will be so constructed as to direct purge gas into the enclosure and downwardly across the heat flux detector, out through the window in the bottom of the enclosure which faces the hot glass and molten metal. In this way, the window is kept clean during operation. The purge gas tubes are directed into the coolant tubes by means of pressure seals mounted in T's or crosses, as is shown in FIG. 1.

Sheathed and insulated signal wire 25 is connected to the heat flux detector and passed out through the coolant water tube 31 and through a pressure seal to a connecting plug 37. As shown in FIG. 1, a second outlet 38 may be provided. This may optionally be connected to independent heat flux detecting means or to a glass temperature or molten metal temperature sensing means provided in enclosure 21.

Figure 2:
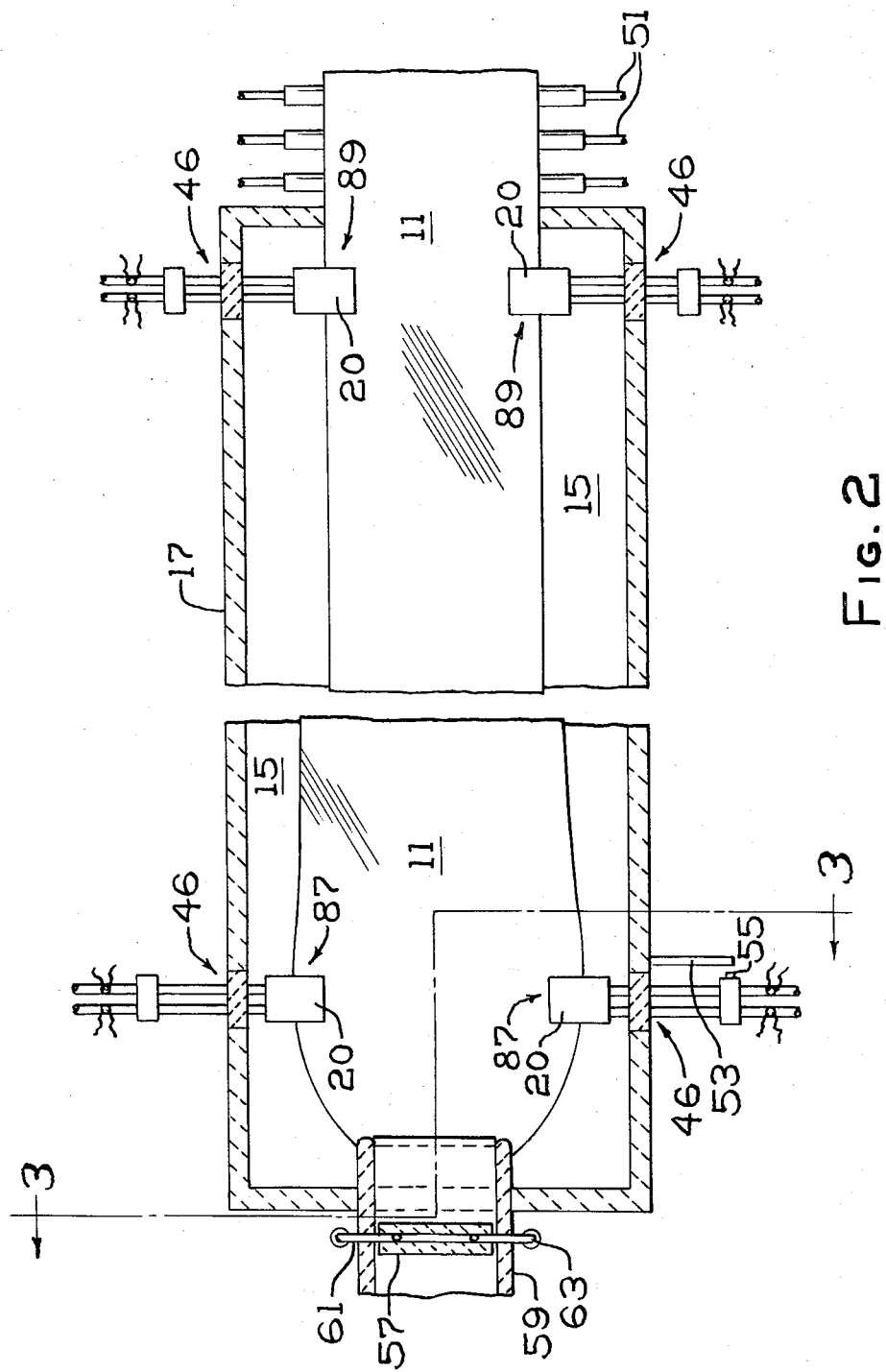
FIG. 2 is a schematic plan view of a float bath, showing a plurality of edge detectors, such as shown in FIG. 1, arranged in combination to provide for the detection of the width and lateral position of a ribbon of float glass during its formation. A pair of edge detectors is shown with the two in opposing relationship at the cold or exit end of the float bath chamber to measure the ultimate ribbon width, and a second pair is shown mounted in opposing relationship at the hot end of the bath close to the location of expected maximum ribbon width. Also shown is the canal with its tweel for controlling the discharge of molten glass into the float bath chamber.
Figure 3:
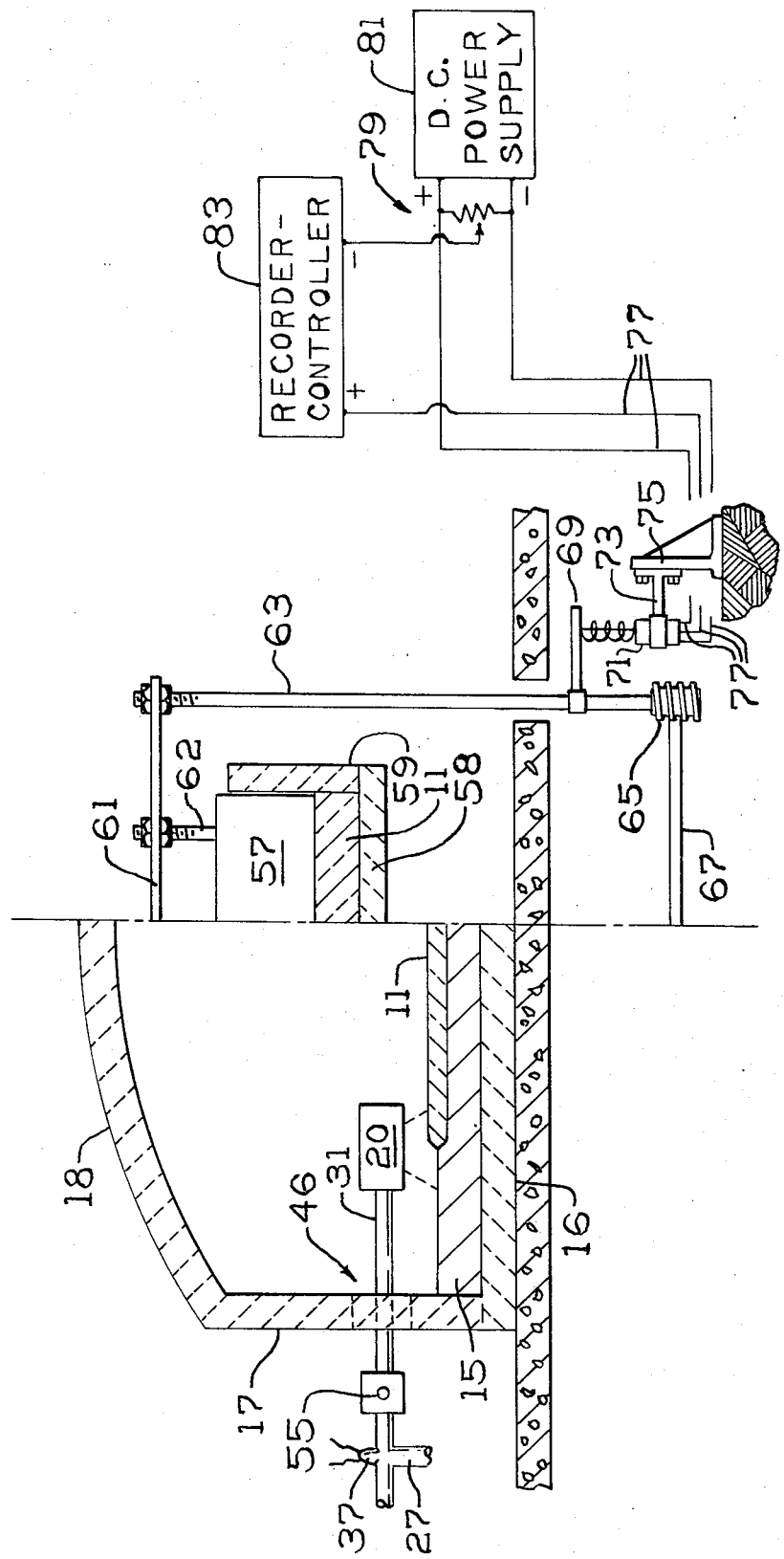
FIG. 3 is a schematic partial sectional view of a float bath chamber taken along section line 3—3 of FIG. 2. Shown in FIG. 3, in the left portion, is one of a pair of edge sensors for detecting the upstream width of the floating ribbon of hot glass. Shown in the right portion is the tweel with its operating mechanism for adjusting the position of the tweel and controlling the cross-sectional flow area through the canal, and means for monitoring the position of the tweel during operation.

FIG. 2 and FIG. 3 illustrate a combination of glass edge detecting devices arranged in opposing pairs to detect the width of the floating glass at different positions along its path of travel through the forming bath. The width of the ribbon may be determined from the detected edge positions from two opposing edge detectors, combined with the detection of the relative spacing between the two detectors, which in turn may be determined from the relative position of each detector with respect to the float bath chamber of known width.

In FIGS. 2 and 3, only one of the edge detectors is shown with means for detecting the position of an edge detector 20 with respect to the side of a float glass bath. In practice, all edge detectors are provided with such position detecting means. A simple position detecting means comprises a rod 53 having gradations indicated thereon and a pointer 55 mounted on the supporting coolant pipes which hold edge detector 20 in position. Suitable gradation markings on rod 53 are such as to indicate the distance between the center of the elongated heat flux detector in edge detector 20 from the outside surface of refractory wall 17 through which the supporting coolant pipes pass.

Figure 4:
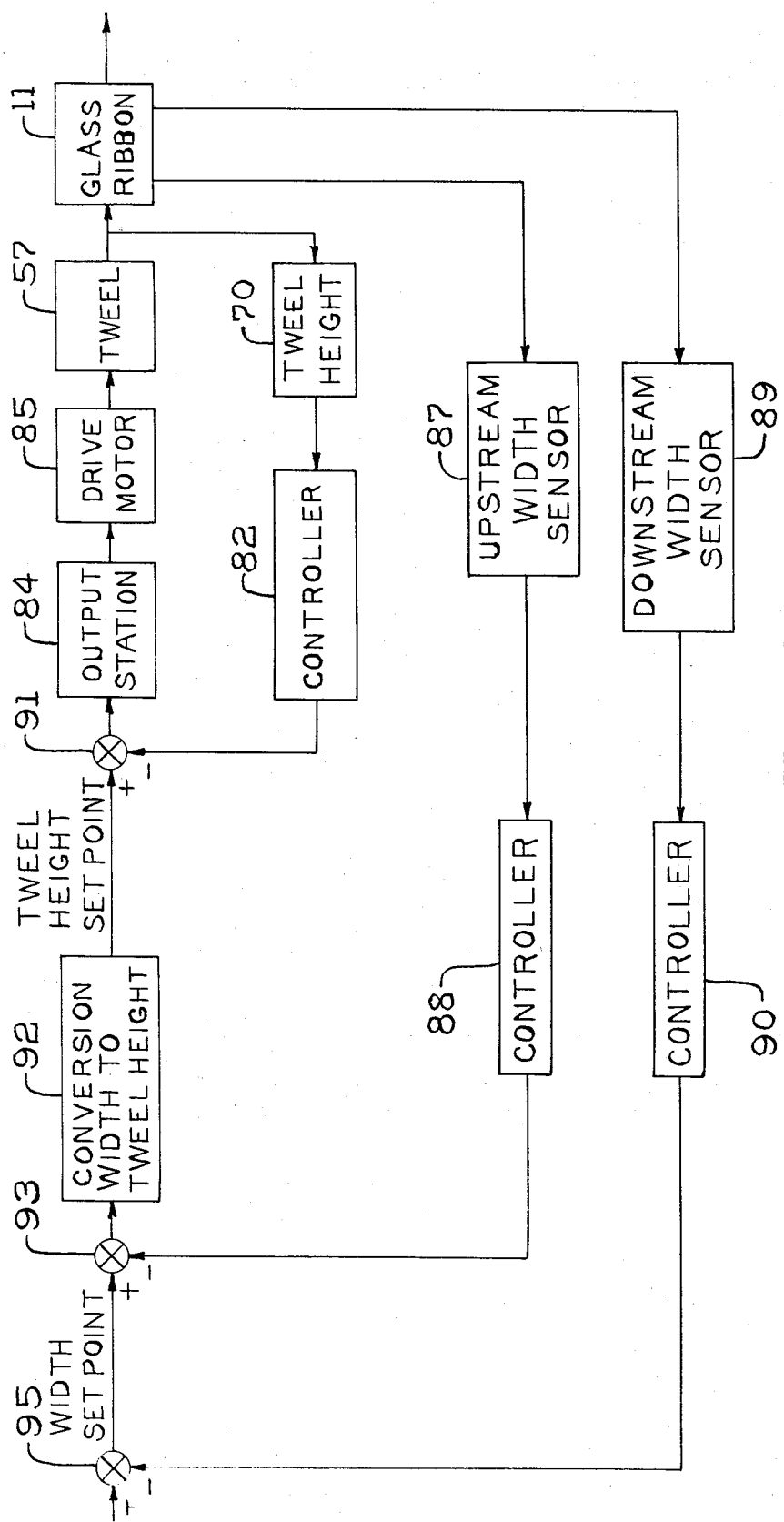
FIG. 4 is a schematic representation of the nested control loops employed in the present method.

Observing together FIGS. 2 and 4, a pair of edge sensors positioned in opposing relationship on opposite sides of the float bath chamber comprises a width sensor. An upstream width sensor 87 is provided which comprises the two edge detectors 20, shown to the left of FIG. 2. A downstream edge sensor 89 comprises the two edge detectors 20, shown on the right side of FIG. 2. In calibrating each edge sensor, the output signal, in terms of current or voltage for each heat flux detector of each edge sensor 20, is determined as a function of glass edge position with respect to the distance along the greatest dimension of the elongated detector. Typical detectors which are employed are from about 10 inches to 14 inches in length, though detectors of lesser or greater lengths may be employed. A calibration curve is determined for each edge detector. Each curve comprises a curve which is of slight S-shape with the dependent variable being distance as, for example, in inches, and the independent variable being the output signal, for example, in millivolts. A high reading is determined when the entire length of the detector is disposed over hot glass, and a low reading is determined for each detector when the entire detector is disposed over molten metal.

To establish the individual detectors for sustained operation, they are positioned so that the signal output initially is midway between the high and low readings. The position of each edge detector with respect to the outside surface of the closest bath chamber sidewall is determined as above described. This position measurement may be defined as the distance from the center of the detector, the distance from the outermost extreme of the detector, or the position from the innermost extreme of the detector. Since the detector response is not perfectly linear, it is desirable for convenience to have the measured distance from the sidewall be the distance to the center of the detector. The distance from the center line of the float bath chamber to the outside surface of the sidewall is fixed and known, and the distance from the center line to the edge of the glass ribbon is defined by the following relationship:

$$Xw = X_{td} - X_0 K \left( \frac{S - S_{mid.}}{S_{max.} - S_{min.}} \right)$$

where $Xw$ is the distance of the glass edge from the center line of the bath, $X_{td}$ is the distance to the outer surface of the sidewall from the center line of the bath, $X_0$ is the distance from the outer surface of the sidewall to the center line of the detector, K is a proportionality constant defining the slope of the function length (or position-vs.-voltage, K is the effective length of the detector, $S_{max.}$ is the high signal obtained when the detector is entirely over glass, $S_{min.}$ is the low signal obtained when the detector is entirely over molten metal, $S_{mid.}$ is the midpoint signal halfway between the high and the low signals, and S is the detected signal at the time for detecting the position of the glass edge, Taking, for example, the width detector 87 combining two edge detectors, the width of the ribbon at this point upstream in the float bath chamber is the sum of the center line to glass edge distances obtained for the opposite edges of the ribbon obtained from the opposing glass edge detectors. The individual center line to glass edge distances are obtained in the manner described above. Means for carrying out the described method of determining glass ribbon width may be an analog computer or a digital computer programmed to function in a manner defined by the equation above.

The method which has been described for determining the glass edge position and the glass ribbon width is a method which allows the rapid determination of these quantities using a simple and reliable method in a digital computer. The method avoids having to account for non-linearity in detector response by operating within the detector midrange and provides independent indications of each edge so that lateral movement of the whole ribbon of glass is detected in addition to variations in the ribbon width.

Downstream width sensor 89, combining the output signals of a pair of opposing edge detectors, is operated in a manner similar to that described for upstream witdh sensor 87.

Since the response or sensitivity of each edge detector in a pair comprising a width sensor may vary, the signal obtained from each of the detectors is preferably conditioned as described above before combining the two to obtain a ribbon width, although it would be possible to directly combine the signals and interpret the combined signal as a ribbon width. If the individual signal conditioning is not accomplished by providing individual response equations defined by particular high and low readings and particular proportionality constants in an analog or digital computer as has been described above, it is possible to employ voltage divider circuits on individual edge detectors which can bias each circuit to the same sensitivity as the circuit for an opposing edge detector and permit the use of a conventional two-pen recorder, for example, with two edge detectors to provide a continuous monitoring of ribbon width and ribbon position.

As shown in FIG. 2, and more particularly in FIG. 3, the discharge of molten glass into the float bath forming chamber is through a canal comprising bottom 58 and sidewalls 59, with the cross-sectional flow area of the canal defined by the vertical position of a tweel or sluice gate 57. The tweel is supported by a pair of support arms 62, which are connected to a tweel cross-support 61, which is in turn mounted on upright tweel drive shafts 63, one of which is shown in FIG. 3. The upright tweel drive shafts are connected to screw jacks 65, which may be operated by a hand wheel or drive motor 85 (FIG. 4) through screw jack linkage 67. Alternatively, a hydraulic apparatus may be provided in place of screw jack 65 to move the tweel up and down.

Mounted on the upright tweel drive shaft is a bracket 69, which may be used to indicate the vertical position of the tweel. This indicator bracket 69 rests against a spring loaded shaft of a linear potentiometer 71 (or a linear differential transformer or other linear motion transducer). The linear potentiometer 71 is mounted by means of an adjustable mounting 73 on a support bracket 75. The position of the linear potentiometer 71 may be adjusted to accommodate the expected range of motion of the tweel.

When employing a linear potentiometer, the potentiometer is supplied with power from DC supply 81. The position of the shaft of the linear potentiometer 71 defines the resistance across which a voltage is detected, which is directed along the positive connector wire 77 to recorder controller 83. The negative connector wire to recorder controller 83 is directed to a variable balancing potentiometer 79, which is employed to calibrate and adjust the output signal and is connected across the positive and negative leads of DC power supply 81.

The combination of elements, which includes the linear potentiometer and the associated brackets, power supply and lead wires, define a tweel height sensor 70, shown in FIG. 4. The controller 82, shown in FIG. 4, may replace or be connected in parallel with recorder controller 83, shown in FIG. 3.

The combination of elements provided to carry out the method of the present invention is shown in FIG. 4 with the functional relationships of the elements particularly pointed out. The combination is seen to comprise three control loops, one nested within another, with the innermost control loop the loop directly operating the position of the tweel within the canal which supplies molten glass to the float-forming bath.

The tweel 57 may be adjusted upwardly or downwardly to assume particular positions within the canal and control the cross-sectional area through which molten glass may flow. Tweel height sensing means 70, which preferably comprises the elements described above, senses the position of the tweel and generates a signal representative of the tweel position, which signal is directed to controller 82. The controller 82 may be a conventional analog or digital controller or may comprise a portion of a digital computer particularly programmed to perform the function of a controller. The controller may provide indicating or reporting means to generate and display human readable representations of the tweel height in engineering terms. The controller 82 is configured to generate and supply an output signal representative of the tweel height which may be compared with a tweel height setpoint. This signal is directed to a comparator 91 to which is also directed a tweel height setpoint.

The comparator 91 compares the generated signal with a tweel height setpoint to generate a control signal which is directed to an output station 84, which in turn generates and holds a signal which controls the operation of a drive motor 85, which in turn drives the tweel 57 up or down in response to the control signal. The drive motor is directly connected to screw jack linkage 67, which turns screw jack 65, raising or lowering the tweel by raising or lowering the upright tweel drive shaft 63, as shown in FIG. 3 Alternatively, the drive motor may be connected to the screw jack linkage 67 through a gear means or clutch (not shown). As will be apparent to those skilled in the art, a drive motor may be replaced by other equivalent operator devices.

The output station 84 will preferably be a current output station, such as conventionally available, for use in conjunction with digital computers. The output station 84 will preferably be or function as a holding operational amplifier which holds a substantially constant output signal after such a signal is established by a positively imposed input signal. By the employment of such a device, the overall control loop is made stable and substantially failsafe in the event of a failure in tweel height sensor 70, controller 82 or comparator 91.

An upstream width loop is provided, as shown in FIG. 4. This loop comprises an upstream width sensor 87 comprised of a pair of edge detectors 20, which detect the width of the hot glass ribbon at a point in the bath where the glass is behaving substantially as a viscous liquid. Preferably, the upstream width sensor will be positioned at a point near to that where the ribbon has its maximum width when making equilibrium or thinner glass. The upstream width sensor comprises not only the edge sensors but also associated circuitry for a portion of a properly programmed digital computer to convert the independent edge detector signals to a representation of the glass ribbon width. Such a combination is described above, along with the particularly preferred method for converting such signals to a representation of the glass ribbon width. In accordance with the method described above, a signal representative of the glass ribbon width is generated by upstream width sensor 87 and directed to controller 88, which may be any of the varients described above for controller 82. Responsive to the particular mode of control dictated by controller 88, a signal is generated by controller 88 which is appropriate for comparison with an upstream ribbon width setpoint. This signal, along with an upstream width setpoint, is directed to comparator 93, wherein the two are compared to generate an output control signal, which may be a direct representation of an appropriate control signal corresponding to a dynamic tweel height setpoint and directed to comparator 91. Alternatively, the control signal may require conversion to an appropriate signal for tweel height control and, as this will generally and preferably be so, the signal will be directed to a converter 92, which generates a signal proportional to the signal emanating from comparator 93 and directs that generated signal to comparator 91 for modifying the tweel height control loop in a dynamic fashion.

In a manner similar to that described for the upstream ribbon width control loop, a downstream ribbon width control loop is provided, as illustrated in FIG. 4. This loop has nested within it both the tweel height control loop and the upstream ribbon width control loop. The downstream ribbon width control loop comprises downstream width sensor 89 connected to controller 90, which is in turn connected to comparator 95, which ultimately directs a dynamic setpoint to comparator 93 of the upstream ribbon width control loop.

While the control loops employed in carrying out the present method have been illustrated as having current values of sensed parameters corresponding to the tweel height and two ribbon widths directed to controllers 82, 88 and 90, which in turn generate signals directed to comparators 91, 93 and 95, respectively, it is possible to provide an equivalent control scheme wherein the controllers are placed within the loops between comparator 91 and 84, between comparator 93 and converter 92, and between comparator 95 and comparator 93, respectively. In this arrangement, the sensed signal representative of the process condition in each instance is compared with a setpoint and the comparator output is an error signal which is directed to its respective controller which operates on the error signal to generate an output or control signal directed to the next element in the particular control loop.

In a particularly preferred method for carrying out the present invention, wherein the process lag time from the tweel to the first edge sensor is from about 30 to 90 seconds and the process lag time from the first width detector to the second width detector is from about 5 to 15 minutes, the comparators are all setpoint and sensed signal comparators generating error signals which are directed to controllers. The control mode of each controller is proportional and integral, with a dead band provided. The particular control mode of controller 82 with the controller functionally positioned in the loop between comparator 91 and output station 84 is $$S_{cT} = K_{pT}\epsilon_T + K_{iT}(\epsilon_T - \overset{|}{\epsilon_T})(\Delta t_T)$$

where $S_{cT}$ is the control signal generated, $\epsilon_T$ is the present error and $$\overset{|}{\epsilon_T}$$

is the error from the previous cycle, and where the constants in the control equation are:

$K_{pT}$ = (proportionality constant) in range from 1.2 to 5 and preferably about 2.5, $K_{iT}$ = (integral constant) in range from 2 to 8 per minute and preferably about 4 per minute, $\Delta t_T$ = control cycle time in range from 2 to 8 seconds and preferably 4 seconds.

The controller 88 is functionally positioned between comparator 93 and converter 92 and is functionally described by the following relationship:

$$S_{cW_1} = K_{pW_1}\epsilon_{W_1} + K_{iW_1}(\epsilon_{W_1} - \overset{|}{\epsilon_{W_1}})(\Delta t_{W_1})$$

where $S_{cW_1}$ is the control signal generated, $\epsilon_{W_1}$ is the present error, $$\overset{|}{\epsilon_{w1}}$$

is the error from the previous cycle, and where the constants in the equation are defined as:

$K_{pW_1}$ = (proportionality constant) in range from .12 to .22 and preferably about .17, $K_{iW_1}$ = (integral constant) in range from 1 to 4 per minute and preferably about 2 per minute, $\Delta t$ = control cycle time in range from 8 to 32 seconds and preferably about 16 seconds.

Controller 90 is functionally positioned between comparator 95 and comparator 93, and its function is defined as:

$$S_{cW_2} = K_{pW_2}\epsilon_{W_2} + K_{iW_2}(\epsilon_{W_2} - \overset{|}{\epsilon_{W_2}})(\Delta t_{W_2})$$

where $S_{cW_2}$ is the control signal generated, $\epsilon_{W_2}$ is the present error and $$\overset{|}{\epsilon_{w2}}$$

is the error from the previous cycle or, preferably, the average error from several previous cycles as described below, and where the constants are defined as:

$K_{pW_2}$ = (proportionality constant) in range from .02 to .5 and preferably in range from .05 to .2, $K_{iW_2}$ = (integral constant) in range from .5 to 5 per minute and preferably in range from .5 to 2 per minute.

Δt = control cycle time at least one minute and preferably at least 5 minutes or more, preferably about 10 minutes.

The preferred dead band for the tweel height loop is from about 1 to about 6 thousandths of an inch in tweel height vertical position. The dead band in the upstream ribbon width control loop is preferably from about 0.1 to about 0.6 inch. The dead band in the downstream ribbon width control loop is preferably from about 0.05 to about 0.4 inch.

In the above relationships and in the relationship for generating an edge position signal, the constants may be made to depend upon the glass temperature. Thus, for example, the proportionality constants may be made simple linear functions of glass temperature detected as described above.

The preferred method provides for sampling the tweel height every 4 to 8 seconds and generates a control signal in each cycle. The upstream ribbon width is detected and a dynamic tweel height setpoint generated at least every 32 seconds, and preferably at least every 8 seconds. The downstream ribbon width is detected and a dynamic upstream width setpoint generated at least every 10 minutes, and preferably at least every 30 seconds.

In the present method, the preferred cycle time for the outermost control loop is about one minute. However, the stability of the process is substantially enhanced by performing this downstream ribbon width control based upon a running average of the ribbon width. This running average preferably covers a time period of at least 5 and, more preferably, at least 10 control cycles. The widths detected during the most recent 5 to 10 control cycles are average, and this average, rather than the current width alone, is compared with the preset standard width or setpoint to generate an error signal. This error signal, when directed to the controller, is employed as $\epsilon_{w_2}$ in the controller as it performs its function of generating a control signal. In this embodiment of the method, the previous error $$\epsilon_{w_2}$$

is also an average of the previous 5 to 10 cycles ending with the previous cycle or ending with the cycle occurring 5 to 10 cycles previous or any cycle in between.

Based upon the control cycle frequency, the experienced variation in parameter values and the experienced instrument noise encountered, expected tolerable change in signals are determined. Corresponding tolerance limits are provided for each controller. Current parameter value signals or representations which deviate beyond such empirically determined tolerable limits are treated as instrument errors, and no control action is based upon such signals. Rather, the occurrence of such a signal is employed to generate an additional sensor sampling. This feature of the preferred embodiment of this invention further ensures that the control mode provided is stable.

The raw error signals in each instance are generated by a comparison, generally described as:

$\epsilon_0 =$ (detected width or tweel position) − (width or tweel position setpoint);

where $\epsilon_0$ is the raw error, and intermediate control signals serve as set points.

In order to provide for stable control, the error signals employed in the method for generating control signals are preferably conditioned in the following manner:

$$\epsilon = \frac{\epsilon_0}{|\epsilon_0|}(|\epsilon_0| - D)$$

where $\epsilon$ is the generated error to be provided to a controller,
$\epsilon_0$ is the raw error generated by comparison,
$|\epsilon_0|$ is the absolute value of the raw error,
D is the dead band.

If the absolute value of the raw error is less than the dead band, no control action is taken. This preferably is accomplished by setting $\epsilon$ equal to zero. If the absolute value of the raw error exceeds the dead band control, action is taken in accordance with the described method.

The above description has been generally devoted to the steady-state conditions existing while carrying out the method of this invention. In order to establish these conditions, it is necessary to provide a method for initiating or "starting up" the system. This procedure is now described.

After the installation of detector equipment, controllers, computers and the like with their required interconnections the detectors are calibrated. This is accomplished as described above and in the related, referenced patent application. By this calibration the constants for each edge detector are determined. Thus, the means for accurately and precisely detecting raw edge detector signals and generating edge location and ribbon width representations are established.

The tweel loop is then closed, which means that the tweel is placed under the control of a setpoint or fixed control signal. The initial setpoint or control signal is set equal to a value which corresponds to the current detected tweel position so that initially no control action will be taken, and the tweel will not immediately move upon completion of the circuit which closes the loop. In this way "bumpless" transfer to control is accomplished.

Next, the upstream width control loop is closed. Initially a setpoint or control signal is established which is equivalent to the current width representation so that initially no error will be generated, and the control signal is initially set to a value equivalent to that which would cause no initial corrective control by the tweel loop upon transfer of the signal to it. The loop is then closed without causing any immediate action by the controllers. In this way this control is also "bumplessly" transferred.

During sustained operation a width control loop may be removed from service without causing the tweel loop to cease its control. The edge detectors may be serviced and recalibrated while the process continues. The loop is again placed in operation as described in the preceding paragraph.

The downstream width control loop and intermediate loops are placed in operation in a manner similar to that described for the upstream width control loop.

Finally, a desired final width is used to impose the predetermined standard upon the downstream controller. The method then proceeds as described for steady-state operation with each loop in the sequence being automatically altered by the dynamic setpoint set by the control signal from the next downstream loop. Complete smoothing to steady-state conditions may be established within a number of control cycles at least equal to the number of nested loops which are coupled together.

As will be apparent to those skilled in the art of process control or the art of float glass manufacture, various specific control methods may be developed which employ the concepts of this invention. For example, additional width loops may be interposed in the control scheme if desired or a derivative element could be included in the control function. Accordingly, it will be understood that the present disclosure has been specific in nature in order to facilitate an understanding of the present invention and that the present invention is ot intended to be limited by this specific disclosure but is rather defined by the claims which follow.

What is claimed is:

1. In the method of manufacturing flat glass comprising discharging molten glass through a canal of variable effective flow cross-section defined by a movable tweel and a channel; flowing said molten glass into a float bath chamber onto a pool of molten metal to form a floating ribbon of glass; and applying attenuating forces upon said floating ribbon of glass while cooling said ribbon of glass to form a substantially rigid ribbon of flat glass, an improvement comprising:
  (a) detecting the width of the ribbon of glass at a location sufficiently remote from said canal where the ribbon is sufficiently cooled as to prevent further substantial attenuation thereof and generating a width representative signal;
  (b) detecting the width of the ribbon of glass at a location sufficiently close to said canal where the ribbon is sufficiently hot as to act as a viscous liquid and generating a width representative signal;
  (c) comparing the detected ribbon width signal of (a) with a predetermined standard and generating a first error signal responsive to said comparison;
  (d) generating a first control signal responsive to said first error signal;
  (e) comparing the detected ribbon width signal of (b) with said first control signal and generating a second error signal responsive to said comparison;
  (f) generating a second control signal responsive to said second error signal;
  (g) moving said tweel responsive to said second control signal.

2. In the method of manufacturing flat glass comprising discharging molten glass through a canal of variable effective flow cross-section defined by a movable tweel and a channel; flowing said molten glass into a float bath chamber onto a pool of molten metal to form a floating ribbon of glass; and applying attenuating forces upon said floating ribbon of glass while cooling said ribbon of glass to form a substantially rigid ribbon of flat glass, an improvement comprising:
  (a) detecting the width of the ribbon of glass at a location sufficiently remote from said canal where the ribbon is sufficiently cooled as a prevent further substantial attenuation thereof and generating a width representative signal;
  (b) detecting the width of the ribbon of glass at a location sufficiently close to said canal where the ribbon is sufficiently hot as to act as a viscous liquid and generating a width representative signal;
  (c) detecting the position of said tweel in said canal and generating a tweel position representative signal;
  (d) comparing the detected ribbon width signal of (a) with a predetermined standard and generating a first error signal responsive to said comparison;
  (e) generating a first control signal responsive to said first error signal;
  (f) comparing the detected ribbon width signal of (b) with said first control signal and generating a second error signal responsive to said comparison;
  (g) generating a second control signal responsive to said second error signal;
  (h) comparing said detected tweel position signal with said second control signal and generating a third control signal responsive thereto; and
  (i) moving said tweel responsive to said third control signal.

3. The method according to claim 2 wherein the ribbon width detection is substantially continuous with respect to width and is periodic with respect to time.

4. The method according to claim 2 wherein the temperature of the glass is detected and the error signals are modified responsive thereto.

5. The method according to claim 2 wherein the steps of width detecting comprise
  (a) detecting the position of one glass edge with respect to an elongated edge detecting device and generating a representation, S, thereof (b) detecting the position of said elongated edge detecting device with respect to a fixed position of predetermined distance from the center line of said float batch chamber and generating a representation, $X_o$, thereof,
  (c) generating a representation of the glass edge position, X, according to the relationship:

$$X = X_{td} - X_0 + K \frac{S - S_{mid.}}{S_{max.} - S_{min.}}$$

where $X_{td}$ is the predetermined distance from the center line of the float bath chamber to said fixed position, K is a proportionality constant equal to the effective length of said elongated edge detective device, $S_{max.}$ is the position signal generated as in (a) when the edge detecting device faces only hot glass, $S_{min.}$ is the position signal generated as in (a) when the edge detecting device faces only molten metal, $S_{mid.}$ is the position signal generated as in (a) which is midway between $S_{max.}$ and $S_{min.}$,
  (d) repeating the steps of (a), (b) and (c) for the glass edge opposite to that for which a representation of position was first generated, and
  (e) combining the first generated representation of the first glass edge and the second generated representation of the second, opposing glass edge to generate a representation of the glass ribbon width.

6. The method according to claim 2 wherein said generation of control signals comprises generating control signals proportional to their respective errors with a predetermined dead band.

7. The method according to claim 6 wherein said generation of control signals further comprises generating control signals responsive to the time integral of their respective errors.

8. The method according to claim 2 wherein said steps (d) and (e) comprise comparing a running average detected ribbon width with a predetermined standard and generating a first control signal according to the following relationship $$S_{cw_2} = K_{pw_2} \epsilon_{w_2} + K_{iw_2} (\epsilon_{w_2} - \overset{|}{\epsilon_{w_2}}) (\Delta_t w_2)$$

such that a control signal is generated periodically on a cycle having a period substantially less than the period embracing said running average detected ribbon width.

9. The method according to claim 8 wherein the period between generating control signals is from about one minute to about five minutes and the period embracing said running average detected ribbon width is at least five times greater than said control signal generating period.

References Cited

UNITED STATES PATENTS

| | | | |
|---|---|---|---|
| 2,994,772 | 8/1961 | Green | 250—83.3 H |
| 3,482,954 | 12/1969 | Yuen | 65—158 X |
| 3,500,548 | 3/1970 | Mitsuno | 65—158 X |
| 3,607,193 | 9/1971 | Koln et al. | 65—164 X |

FOREIGN PATENTS

| | | | |
|---|---|---|---|
| 292,448 | 6/1928 | Great Britain | 65—160 |

ARTHUR D. KELLOGG, Primary Examiner

U.S. Cl. X.R.

65—158, 164, 182 R; 250—83.3 H